United States Patent [19]

Tokai

[11] Patent Number: 5,744,943
[45] Date of Patent: Apr. 28, 1998

[54] CIRCUITRY FOR SUPPLYING DC POWER TO A SMALL-SIZE ELECTRONIC APPARATUS

[75] Inventor: Yoichi Tokai, Tokyo, Japan

[73] Assignee: Kabushiki Kaisha Toshiba, Kawasaki, Japan

[21] Appl. No.: 721,056

[22] Filed: Sep. 26, 1996

[30] Foreign Application Priority Data

Sep. 27, 1995 [JP] Japan .................................. 7-249657
Sep. 29, 1995 [JP] Japan .................................. 7-253262

[51] Int. Cl.$^6$ ........................................................ G05F 1/40
[52] U.S. Cl. ............................ 323/282; 323/222; 323/290
[58] Field of Search ................................ 323/222, 223, 323/282, 283, 284, 290

[56] References Cited

U.S. PATENT DOCUMENTS

| | | | |
|---|---|---|---|
| 4,760,324 | 7/1988 | Underhill | 323/282 |
| 4,961,128 | 10/1990 | Bloom | 363/16 |
| 5,109,186 | 4/1992 | Lieu | 323/299 |
| 5,257,170 | 10/1993 | Sprvijt | 363/16 |

Primary Examiner—Peter S. Wong
Assistant Examiner—Shawn Riley
Attorney, Agent, or Firm—Finnegan, Henderson, Farabow, Garrett & Dunner, L.L.P.

[57] ABSTRACT

A chopper-type switching power-supply circuit having a DC high-potential input terminal, a DC low-potential input terminal, a DC high-potential output terminal, and a DC low-potential output terminal. The power-supply circuit has one terminal of an inductor connected to the DC high-potential input terminal and a capacitor connected to other terminal of the inductor. The output circuit contains the DC high-potential output terminal and the DC low-potential output terminal. A first input terminal is coupled to the other end of the capacitor and a second input terminal coupled to the DC low-potential input terminal. An N-channel MOS-FET has a drain electrode connected to the other terminal of the inductor and a source electrode connected to the high-potential output terminal. A control circuit supplies a pulse-width control signal to the gate electrode of the N-channel MOSFET in accordance with the potential at the output terminals of the output circuits, thereby to perform negative feedback chopper control on the N-channel MOSFET.

17 Claims, 16 Drawing Sheets

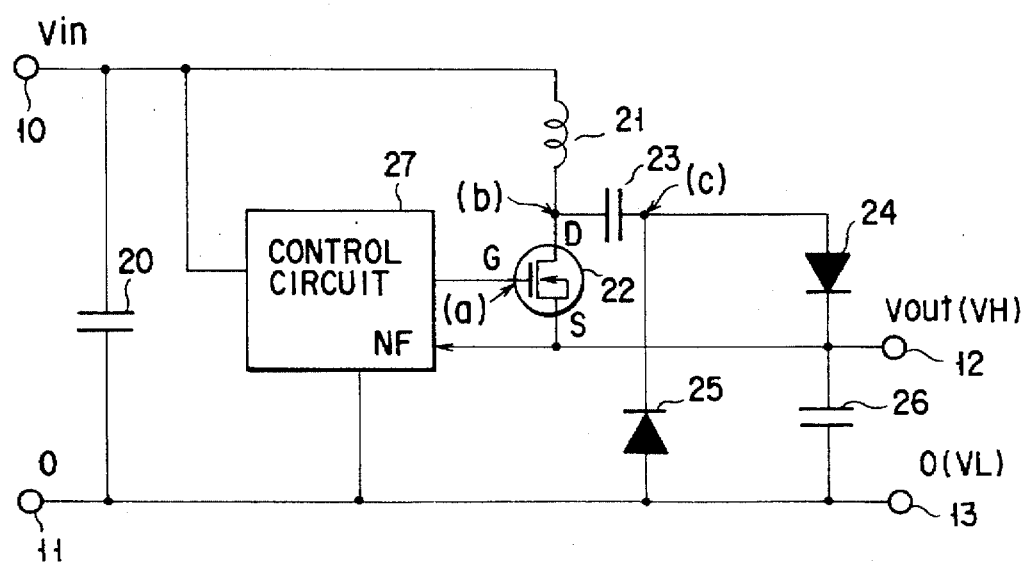
F I G. 4

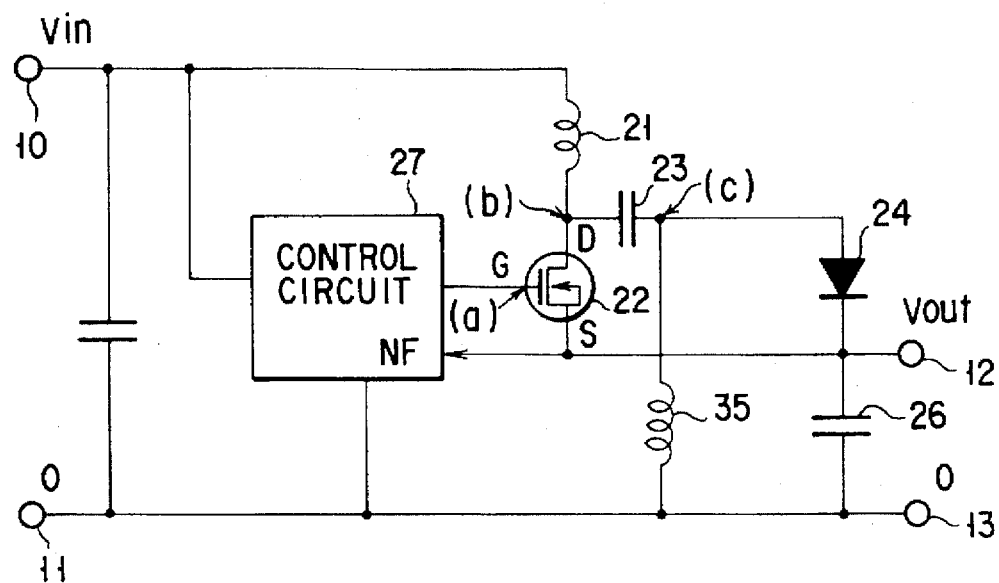
F I G. 9
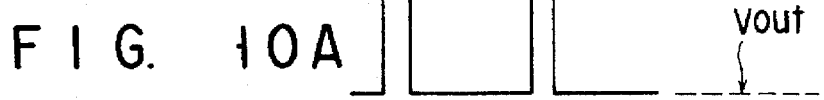
F I G. 10A
F I G. 10B
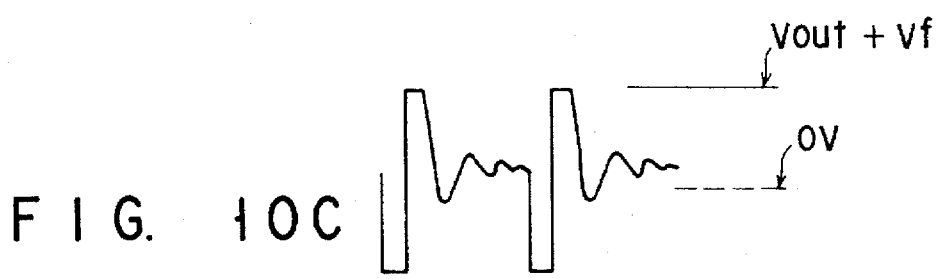
F I G. 10C

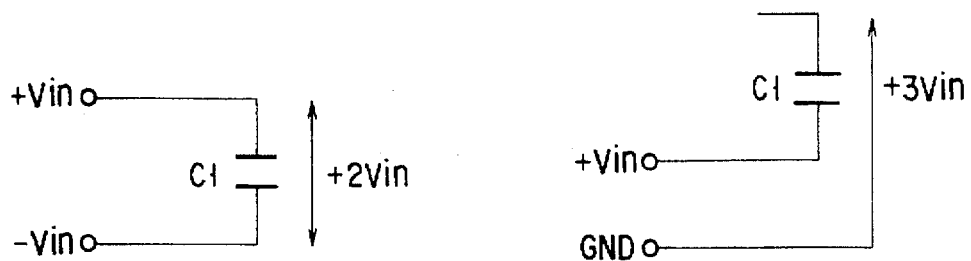
F I G. 22A      F I G. 22B
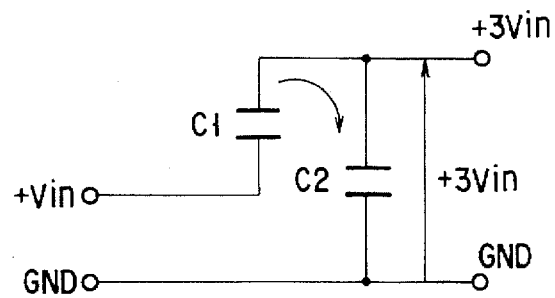
F I G. 22C
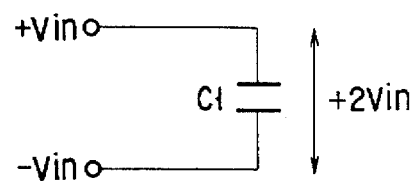     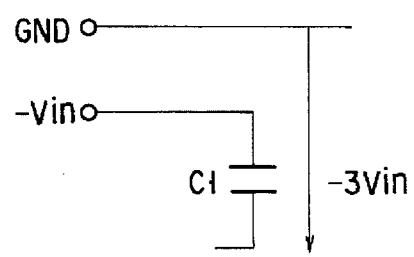
F I G. 23A      F I G. 23B
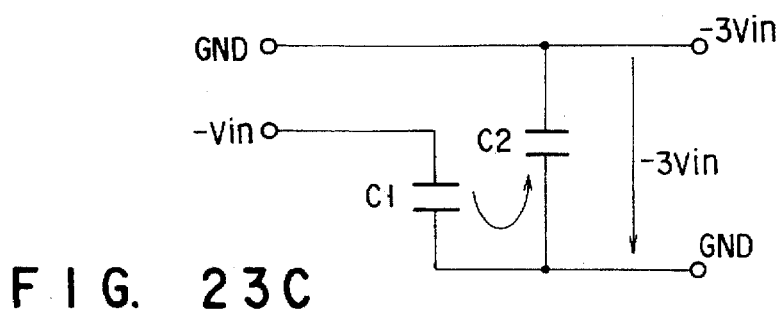
F I G. 23C

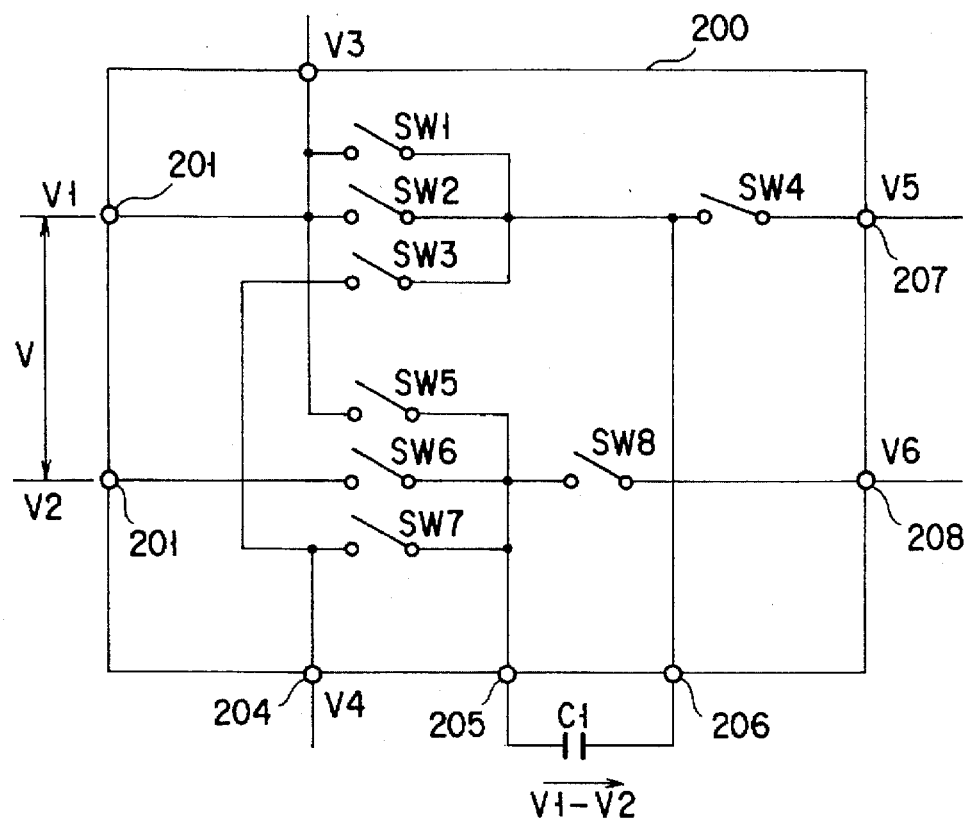
F I G. 24
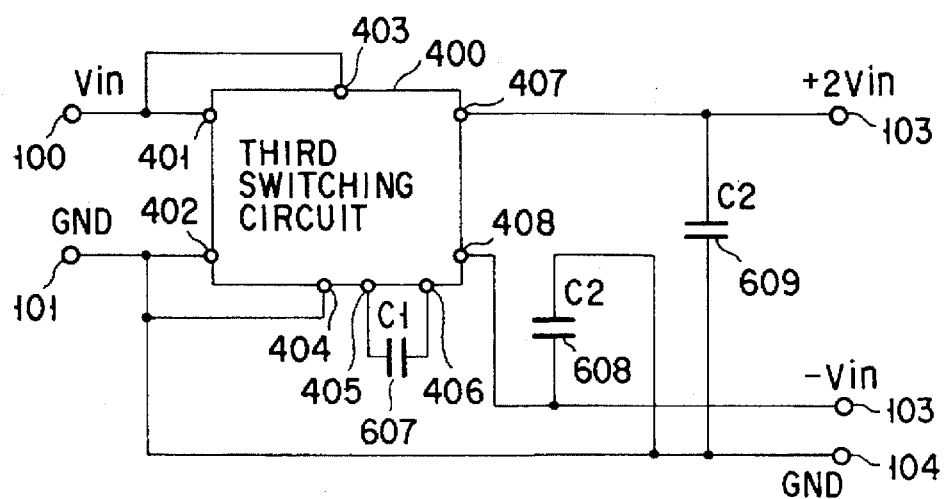
F I G. 26

CIRCUITRY FOR SUPPLYING DC POWER TO A SMALL-SIZE ELECTRONIC APPARATUS

BACKGROUND OF THE INVENTION

1. Field of the Invention

The present invention relates to a chopper-type switching power-supply circuit or a charge pump circuit, designed to supply DC power to a small-size electronic apparatus such as a portable electronic apparatus.

2. Description of the Related Art

In order to enable the devices incorporated in an electronic apparatus to operate at their full capacity, it is necessary in some cases to apply different voltages, not the same voltage, to the devices. A power-supply circuit for driving devices such as a CCD and a liquid crystal display panel must be so designed not only to increase a voltage, but also to lower and invert a voltage. Known as efficient DC-input, DC-output, voltage-converting power-supply circuit are switching power-supply circuits. Switching power-supply circuits are classified into two types. The first type is a transformer-type switching power-supply circuit which has a transformer. The second type is a chopper-type switching power-supply circuit which has an inductor.

With a transformer-type switching power-supply circuit, it is possible to increase, lower, and invert a voltage merely by changing the winding ratio and the GND level of the transformer. A chopper-type switching power-supply circuit which can lower and invert a voltage has a driver, which may be either a P-channel MOSFET or an N-channel MOSFET. In the case where a P-channel MOSFET is used as the driver, the source electrode of the MOSFET is connected to the DC input potential or the DC GND potential. In the case where an N-channel MOSFET is used as the driver as shown in FIG. 1, the MOSFET constitutes a chopper circuit, jointly with an inductor L and a diode D. The chopper circuit can lower and invert an input voltage. As shown in FIG. 1, the node of the diode D and the source S of the N-channel MOSFET is connected to the inductor L in which the potential fluctuates. Hence it is required that the gate-source potential $V_{GS}$ be high enough to turn the N-channel MOSFET on and off reliably. To this end, a circuit must be used which amplifies the input voltage, thus generating a signal voltage, and the signal voltage thus generated must be applied to the gate G of the N-channel MOSFET.

If a switching power-supply circuit, no matter transformer-type or chopper-type, is modified to acquire high-frequency characteristics, it can incorporate a low-rated transformer or a low-rated inductor and a low-rated capacitor and can thus be made smaller. It would therefore be important to impart high-frequency characteristics to a switching power-supply circuit, so as to render the circuit small and light.

An N-channel MOSFET has a higher switching speed and a lower on-resistance than a P-channel MOSFET. In view of this, it is desirable that an N-channel MOSFET be used as the driver in a chopper-type switching power-supply circuit.

In the chopper circuit shown in FIG. 1, the source S of the N-channel MOSFET is connected to the inductor L in which a voltage changes greatly. Therefore, the potential of the gate G is controlled with respect to the source S. This makes it necessary to use a charge pump circuit to increase the input voltage, thereby to expand the range over which the gate-source potential $V_{GS}$ of the MOSFET may fluctuates. The use of the charge pump circuit inevitably increases the switching loss. Consequently, the chopper-type switching power-supply circuit cannot be as efficient as is required of any power-supply circuit for use in small-size electronic apparatuses.

A chopper-type switching power-supply circuit which has an inductor can be more easily modified to have high-frequency characteristic than a transformer-type switching power-supply circuit which incorporates a transformer. However, to achieve a high voltage-raising ratio, the chopper-type switching power-supply circuit needs the assistance of a charge pump circuit which comprises many elements (capacitors and diodes).

Two types of conventional charge pump circuits are shown in FIGS. 2 and 3, respectively. As is seen from FIGS. 2 and 3, either charge pump circuit needs to have four more elements for each additional stage. Obviously, the circuit must be a large-scale one in order to yield a high voltage-raising ratio.

Shown in FIG. 2 are: a first input terminal 1 for receiving a positive input potential Vin, a second input terminal 2 for receiving an input ground potential GND, a chopper-type switching power-supply circuit 3, a charge pump circuit 4 comprising a plurality of capacitors 4a and a plurality of diodes 4b, a first output terminal 5 for supplying a positive output potential Vout, a second output terminal 6 for supplying a negative output potential Vout, and a third output terminal 7 for supplying an output ground potential GND. Illustrated in FIG. 3 is a circuit which is identical to the circuit of FIG. 2, except that the charge pump circuit 8 comprises less capacitors 8a and less diodes 8b.

SUMMARY OF THE INVENTION

An object of the present invention is provide a chopper-type switching power-supply circuit which is relatively simple in structure, having an N-channel MOSFET, and which can yet operate at high efficiency, both lowering and inverting an input voltage.

Another object of the invention is to provide a power-supply device which is relatively simple in structure and which can yet raises an input voltage with a high ratio and invert the input voltage and generate DC voltages of different values.

To achieve the first object, according to the invention there are provided two types of chopper-type switching power-supply circuits and a power-supply circuit.

The first type of a chopper-type switching power-supply circuit according to the invention has a DC high-potential input terminal, a DC low-potential input terminal, a DC high-potential output terminal and a DC low-potential output terminal. The power-supply circuit comprises: an inductor connected at one end to the DC high-potential input terminal; a capacitor connected at one end to the other terminal of the inductor; an output circuit which comprises the DC high-potential output terminal and the DC low-potential output terminal and which has a first input terminal coupled to the other end of the capacitor and a second input terminal coupled to the DC low-potential input terminal; an N-channel MOSFET having a drain electrode connected to the other end of the inductor and a source electrode connected to the high-potential output terminal; and control means for supplying a pulse-width control signal to the gate electrode of the N-channel MOSFET in accordance with the potential at the output terminals of the output circuit, thereby to perform negative feedback chopper control on the N-channel MOSFET.

The second type of a switching power-supply circuit according to this invention has an N-channel MOSFET, an inductor, a capacitor, a diode, a chopper control circuit, an input voltage Vin, an output voltage Vout, and a common potential GND. The inductor is connected between the input voltage Vin and the drain electrode of the N-channel MOSFET. The source electrode of the N-channel MOSFET is connected to a potential VH which is the higher of the output voltage Vout and the common potential GND. The capacitor and the diode are connected in series between the drain and source electrodes of the N-channel MOSFET, with the capacitor connected to the drain electrode. The anode electrode of the diode is connected to the capacitor, and the cathode electrode thereof is connected to the source electrode of the N-channel MOSFET. The input voltage Vin and the potential VH have a relationship of: Vin>VH.

In this circuit, the source of the N-channel MOSFET is connected to the smoothed potential VH. It therefore suffices to supply the gate of the MOSFET with a switching control signal which is positive with respect to the potential VH. The switching control signal has the same amplitude as is used to drive the channel MOSFET whose source is connected to the ground. Hence, the switching loss inevitably made in driving the gate of the MOSFET is less than in the case where an inductor is connected to the source of the N-channel MOSFET.

If the switching control signal is generated by using the potential VL, the N-channel MOSFET can be driven by converting the signal to one based on the potential VH by means of a level-shifting circuit comprised of a capacitor and a diode.

The withstand voltage of the control circuit is lower than Vin–VL. A switching circuit is used which connect the reference voltage (i.e., the ground potential GND) of the control circuit to the potential VH when the withstand voltage is equal to or higher than Vin–VH and which connects the reference voltage to the potential VL when the withstand voltage is higher than Vin–VL. Alternatively, the reference voltage of the control circuit is fixed at the potential VL, and a voltage-lowering means (e.g., a three-terminal regulator or a combination of a resistor and a Zener diode) is used to prevent Vcc–VL from exceeding the withstand voltage.

Thus, the chopper-type switching power-supply circuit is relatively simple in structure, having an N-channel MOSFET, and can yet operate at high efficiency, both lowering and inverting an input voltage.

To attain the second object mentioned above, according to the invention, there is provided a power-supply device which comprises: a DC power-supply and a charge pump circuit for adjusting a DC voltage output from the DC power-supply. The charge pump circuit comprises a plurality of terminals connected to a plurality of capacitors, for receiving a plurality of input voltages, and switching means for switching the terminals, for charging the capacitors with the DC voltage applied from the DC power-supply, thereby to generate a DC voltage different from the DC voltage applied from the DC power-supply.

The DC power-supply may comprise a switching element, an inductor, a rectifying section, a control circuit for performing feedback control on the switching element in accordance with an output of the rectifying section, and a switching power-supply for converting an input DC voltage to a different DC voltage.

The power-supply device is simple in structure. Yet can it raise the input voltage at high ratio and invert the polarity of the input voltage, by charging the capacitors with the DC voltage output from the DC power-supply. Also can it generate DC voltages of different values.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 shows a chopper-type switching power-supply circuit according to a first embodiment of the present invention, which raises the input voltage by using a second diode;

FIG. 9 shows a chopper-type switching power-supply circuit according to a second embodiment of the present invention, which lowers the input voltage by using a second inductor;

FIGS. 10A, 10B and 10C are diagrams showing the waveforms of the signals at points (a), (b) and (c) shown in FIG. 9;

FIGS. 22A, 22B and 22C are diagrams explaining the operation of the eighth embodiment;

FIGS. 23A, 23B and 23C are diagrams, also explaining the operation of the eighth embodiment;

FIG. 24 is a circuit diagram showing the switching circuit incorporated in the eighth embodiment;

FIG. 26 is an equivalent circuit diagram of the third-stage charge pump circuit incorporate in the ninth embodiment.

DETAILED DESCRIPTION OF THE PREFERRED EMBODIMENTS

Figure 1:
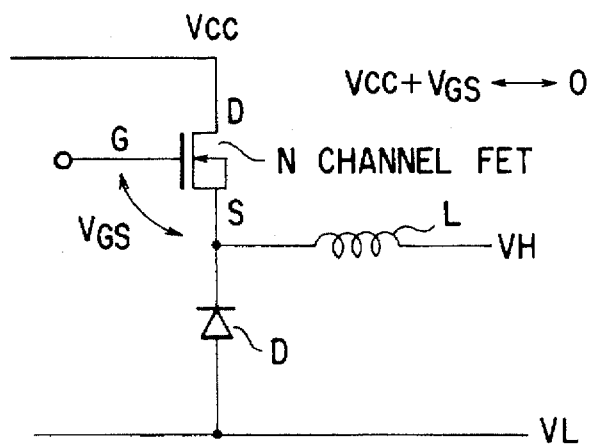
FIG. 1 is a circuit diagram of a chopper circuit, for explaining the problem inherent in a conventional switching power-supply circuit.
Figure 2:
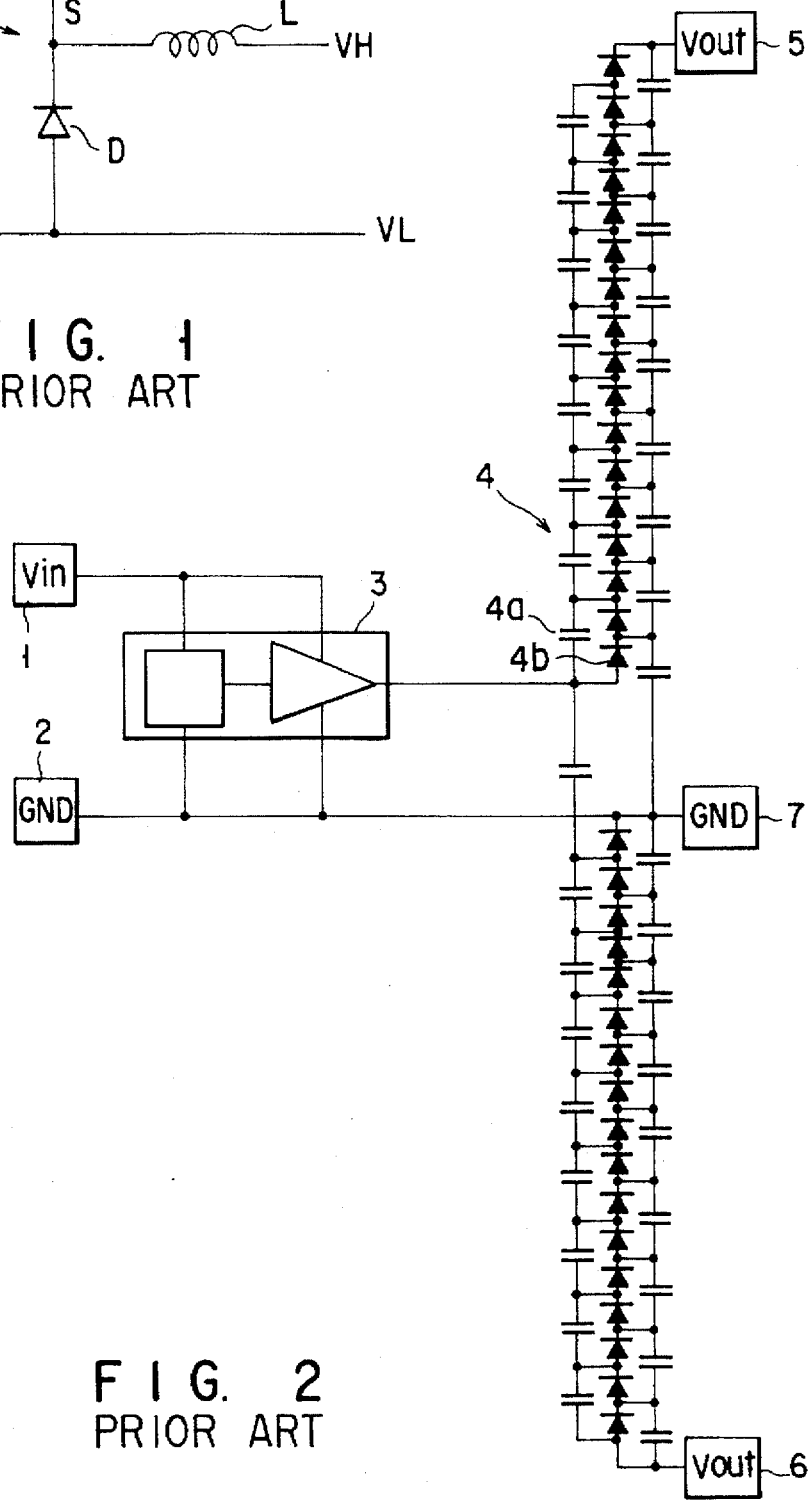
FIG. 2 is a circuit diagram of a conventional charge pump circuit.
Figure 3:
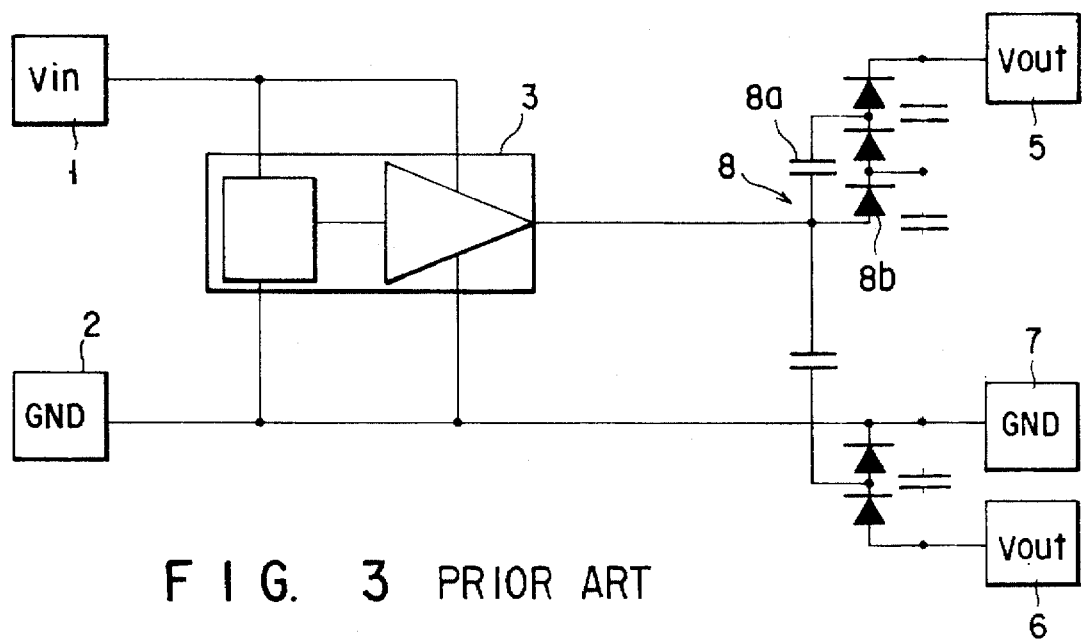
FIG. 3 is a circuit diagram of another type of a conventional charge pump circuit.

Embodiments of the invention will be described, with reference to the accompanying drawings.

First Embodiment

FIG. 4 shows a chopper-type switching power-supply circuit according to the first embodiment of this invention. This is a switching power-supply circuit which has a first diode and which can lower the input voltage. The power-supply circuit comprises two input terminals 10 and 11 and two output terminals 12 and 13. The first input terminal 10 receives a high DC potential Vin, and the second input terminal 11 a low DC potential of 0V. The first output terminal outputs a high DC potential Vout (VH), and the second output terminal 13 a low DC potential of 0V (VL).

As shown in FIG. 4, the chopper-type switching power-supply circuit further comprises three capacitors 20, 23 and 26, an inductor 21, an N-channel MOSFET 22, two diodes 24 and 25, and a control circuit 27. The capacitor 20 is connected at one end to the first input terminal 10 and at the other end to the second input terminal 11. The inductor 21 is connected at one end to the first input terminal 10 and at the other end to the drain electrode of the N-channel MOSFET 22. The source electrode of the MOSFET 22 is connected to the first output terminal 12, which is also connected to the feedback terminal NF of the control circuit 27. The control circuit 27 performs feedback chopper control on the MOSFET 22 in accordance with the output potential Vout (VH). The diodes 24 and 25 and the capacitor 26 constitute an output circuit.

Figure 5:
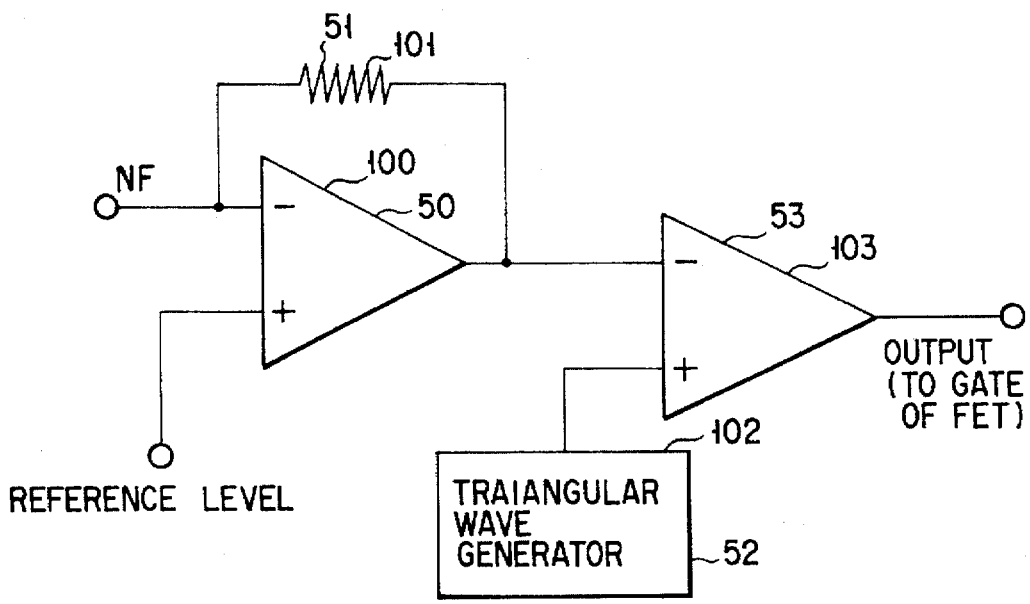
FIG. 5 is a circuit diagram of the control circuit incorporated in the power-supply circuit of FIG. 4.

As illustrated in FIG. 5, the control circuit 27 comprises an operational amplifier 50, a feedback resistor 51, a triangular-wave signal generator 52, and an amplifier 53. The operational amplifier 50 and the feedback resistor 51 constitute a differential amplifier which compares the high DC potential Vout (VH) fed back to the feedback terminal NF with a reference level. The amplifier 53 performs pulse-with modulation (PWM) on the triangular-wave signal supplied from the signal generator 52, in accordance with the output of the differential amplifier.

Figure 6A:
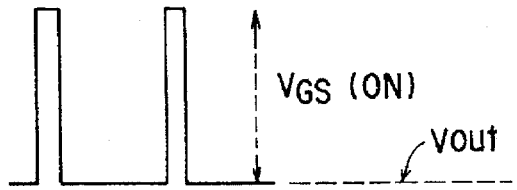
FIGS. 6A, 6B and 6C are diagrams illustrating the waveforms of the signals at points (a), (b) and (c) shown in FIG. 4.
Figure 6B:
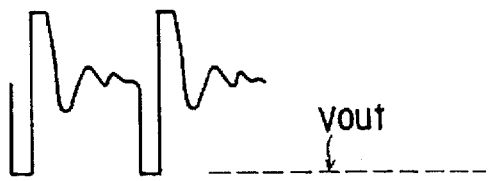
Figure 6C:
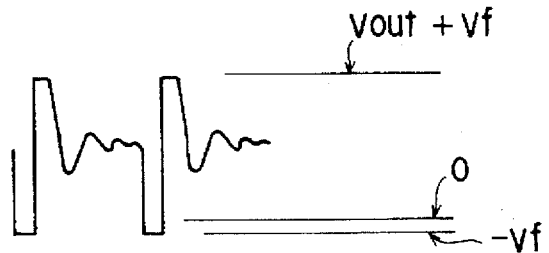

As shown in FIG. 4, the first capacitor 23 is connected at one end to the node of the inductor 21 and the MOSFET 22 (more precisely, the drain electrode of the MOSFET 22) and at the other end to the cathode electrode of the first diode 24 and the anode electrode of the second diode 25. The second capacitor 26 is connected at one end to the anode electrode of the first diode 24 and at the other end to both the cathode electrode of the second diode 25 and the second output terminal 13 which is at potential of 0V (VL). The signals at points (a), (b) and (c) of the power-supply circuit have the waveforms illustrated in FIGS. 6A, 6B and 6C, respectively.

In the chopper-type switching power-supply circuit shown in FIG. 4, the voltage signal at the drain electrode of the N-channel MOSFET 22 has an amplitude which is controlled to have a value of Vout+Vf1+Vf2, where Vf1 is the forward-current voltage drop in the diode 24 and the Vf2 is the forward-current voltage drop in the diode 25.

If Vin>2Vout+Vf1+Vf2, the capacitor 23 will be discharged through the diodes 24 and 25 and the MOSFET 22. The electrostatic energy released from the capacitor 23 will be dissipated as an electric heat loss, not collected at all. As a consequence, the operating efficiency of the switching power-supply circuit will decrease, despite an increase in the DC potential Vin applied to the first input terminal 10. Hence, it is desirable that the DC potential Vin have a value of: Vin≦2Vout+Vf1+Vf2.

Figure 7:
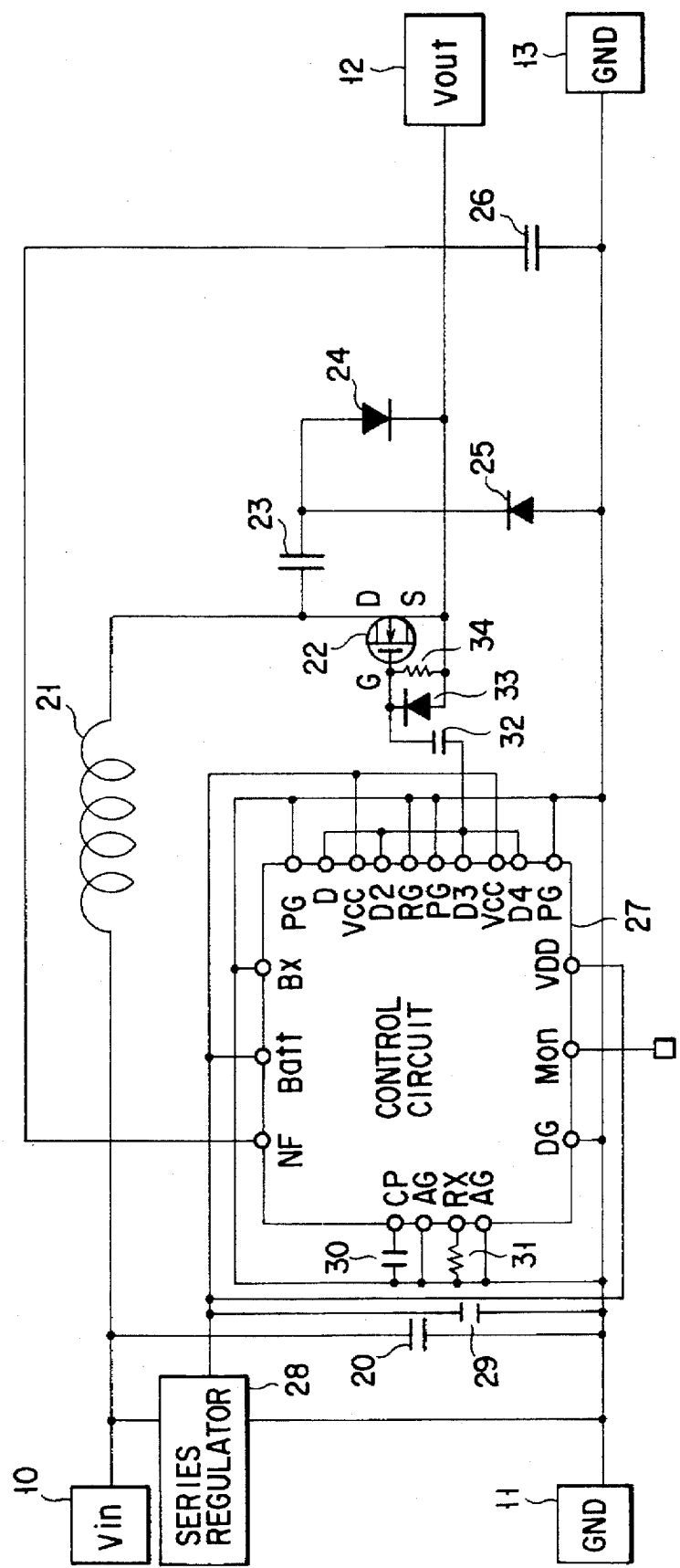
FIG. 7 is a circuit diagram illustrating the power-supply circuit of FIG. 4 in greater detail.

FIG. 7 illustrates the power-supply circuit of FIG. 4 in greater detail. The circuit is designed to output a DC voltage of 5V. As can be understood from FIG. 7, a series regulator 28 applies to the control circuit 27 a voltage which is equal to or lower than the withstand voltage of the control circuit 27. As shown in FIG. 7, the power-supply circuit comprises three more capacitors 29, 30 and 32, one more diode 33 and a resistor 34.

Figure 8:
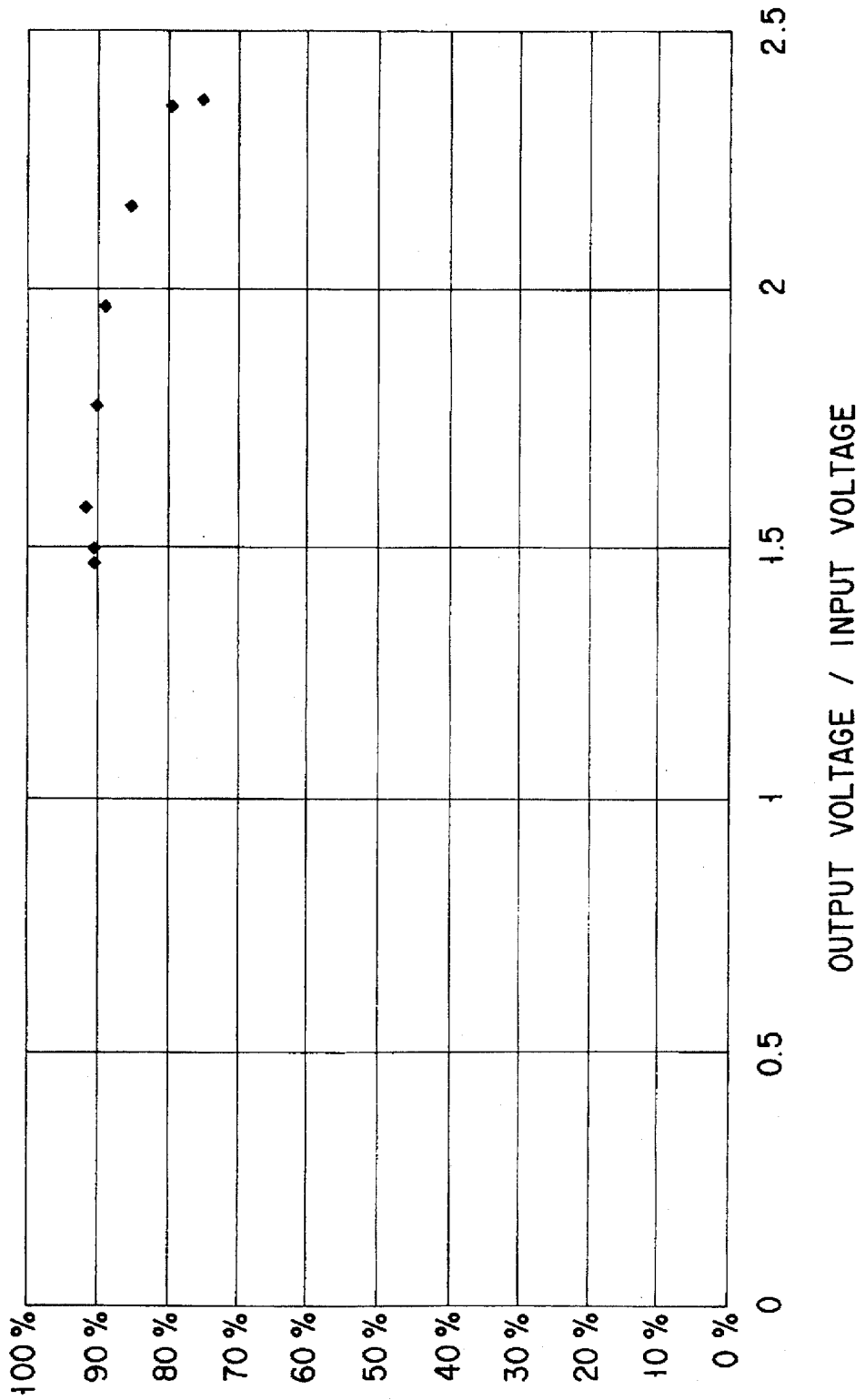
FIG. 8 is a table representing the operating efficiency of the power-supply circuit illustrated in FIG. 4.

FIG. 8 is a table which represents the operating efficiencies the power-supply circuit of FIG. 4 exhibits when the circuit outputs a current of 600 mA. As evident from FIG. 8, the efficiency is nearly 90% when Vin≦2Vout=Vf1+Vf2. The control circuit 27 supplies a pulse-width control signal of 5 MHz to the gate electrode of the N-channel MOSFET 22.

Second Embodiment

FIG. 9 and FIGS. 10A to 10C illustrate a chopper-type switching power-supply circuit according to the second embodiment of the invention. The second embodiment differs from the first embodiment (FIGS. 4 and 7) in that a second inductor 35 is provided in place of the second diode 25. In the second embodiment, the second inductor 35 constitute an output circuit, jointly with a diode 24 and a capacitor 26.

Figure 11:
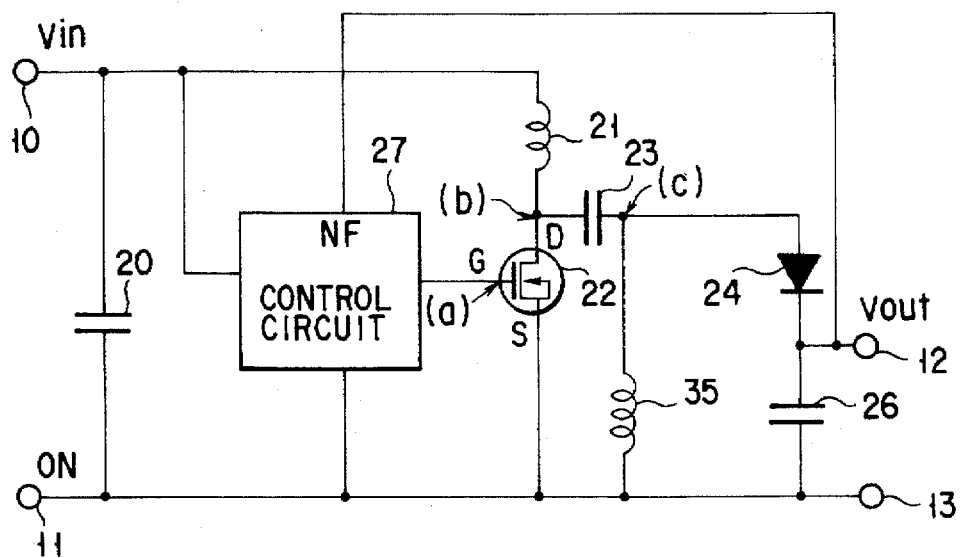
FIG. 11 is a circuit diagram of a conventional voltage-raising/lowering circuit.
Figure 12A:
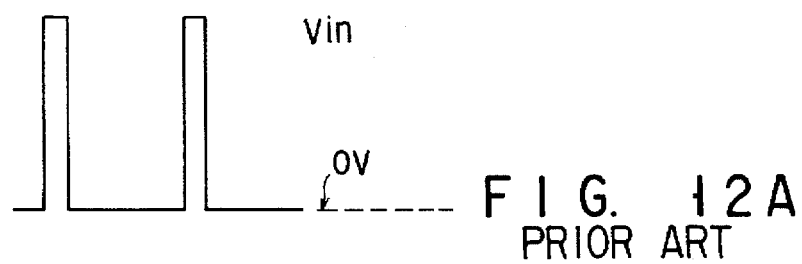
FIGS. 12A, 12B and 12C are diagrams depicting the waveforms of the signals at points (a), (b) and (c) shown in FIG. 11.
Figure 12B:
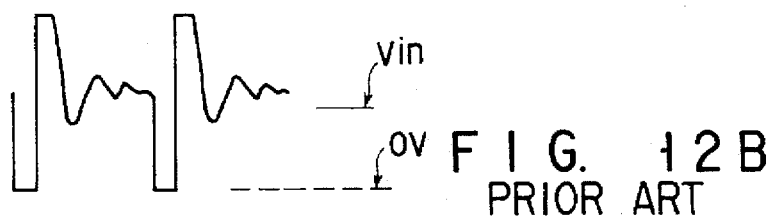
Figure 12C:
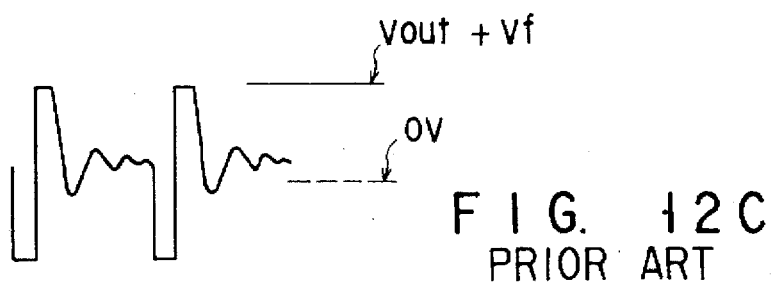

The second embodiment differs from a conventional voltage-raising/lowering circuit shown in FIG. 11, in some respects. (FIGS. 12A, 12B and 12C show the waveforms of the signals at points (a), (b) and (c) shown in FIG. 11.) First, the source electrode of the MOSFET 22 is connected to the first output terminal 12, whereas the source electrode of the MOSFET 22 is connected to the ground in the conventional voltage-raising/lowering circuit. Second, the second embodiment operates as efficiently as a series regulator even if no current is circulating, and can operate more efficiently than a series regulator if a current is circulating. This is because both the drain current of the MOSFET 22 and the circulating current can be output. By contrast, the drain current of MOSFET 22 cannot be be output in the conventional voltage-raising/lowering circuit, since the current flowing in the MOSFET 22 flows to the ground, rendering the average of the output current equal to the average of the current flowing through the second inductor 35.

In the second embodiment, the current is supplied to and from the capacitor 23 through the first inductor 21 or the second inductor 35. Thus, even if an voltage is input and output in such a condition that a heat loss would be made in the first embodiment, the second inductor 35 will collect the energy in the form of magnetic energy. Thus, the operating efficiency of the second embodiment remains sufficiently high even if Vin>Vout+Vf1+Vf2.

Third Embodiment

Figure 13:
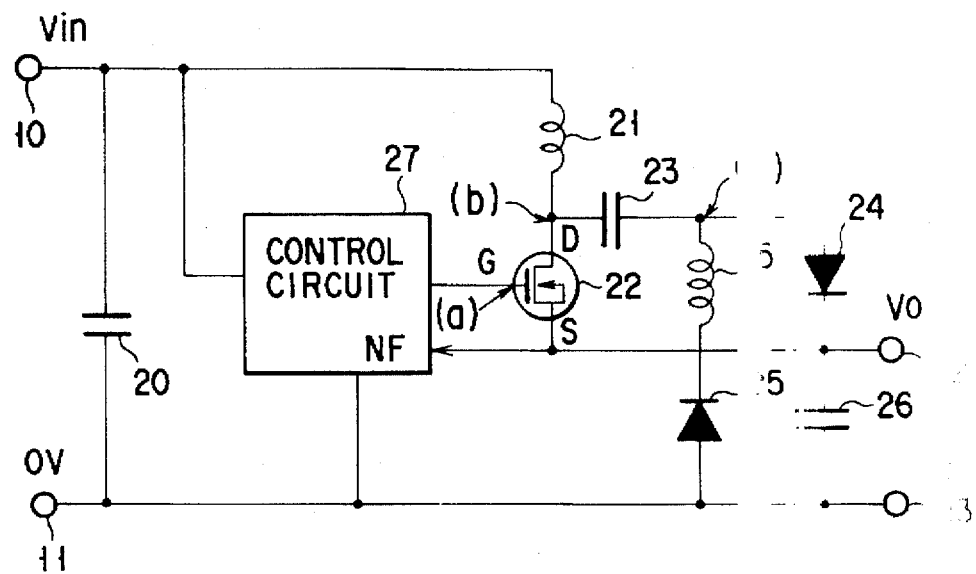
FIG. 13 illustrates a chopper-type switching power-supply circuit according to a third embodiment of the present invention, which lowers the input voltage by using a second diode and a second inductor.
Figure 14A:
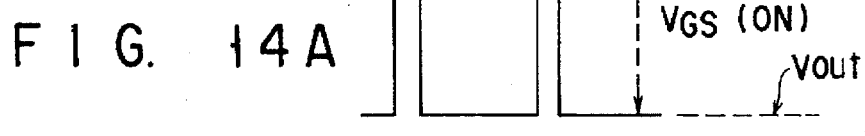
FIGS. 14A, 14B and 14C are diagrams depicting the waveforms of the signals at points (a), (b) and (c) shown in FIG. 13.
Figure 14B:
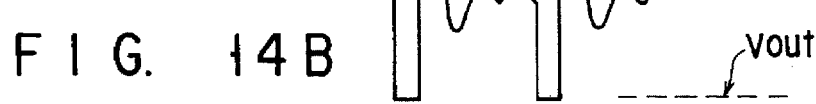
Figure 14C:
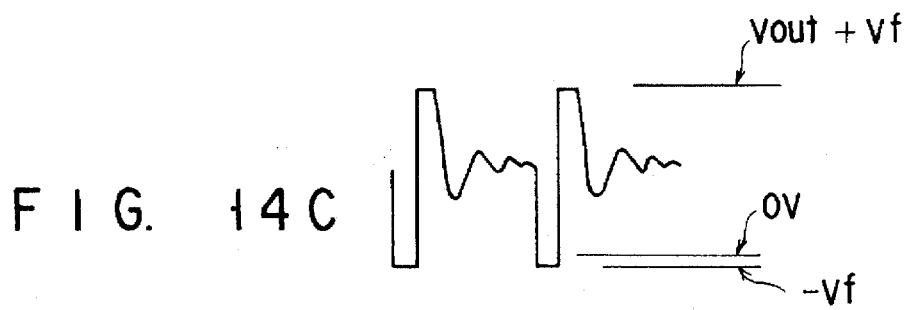

FIG. 13 illustrates a chopper-type switching power-supply circuit according to the third embodiment of the invention. FIGS. 14A, 14B and 14C depict the waveforms of the signals at points (a), (b) and (c) shown in FIG. 13. This power-supply circuit comprises two diodes 24 and 25, a capacitor 26 and two inductors 21 and 35. The first diode 25 and the second inductor 35 are connected in series.

In the third embodiment, the second diode 25 accelerates the attenuation of the signal wave after a current ceases to circulate. Nonetheless, as the circulating current flows through the second diode 25, a voltage drop corresponding to Vf occurs. It is therefore preferred that the third embodiment be used if it is more important to minimize the attenuation of the signal wave, than to reduce the decrease in the operating efficiency.

Fourth Embodiment

Figure 15:
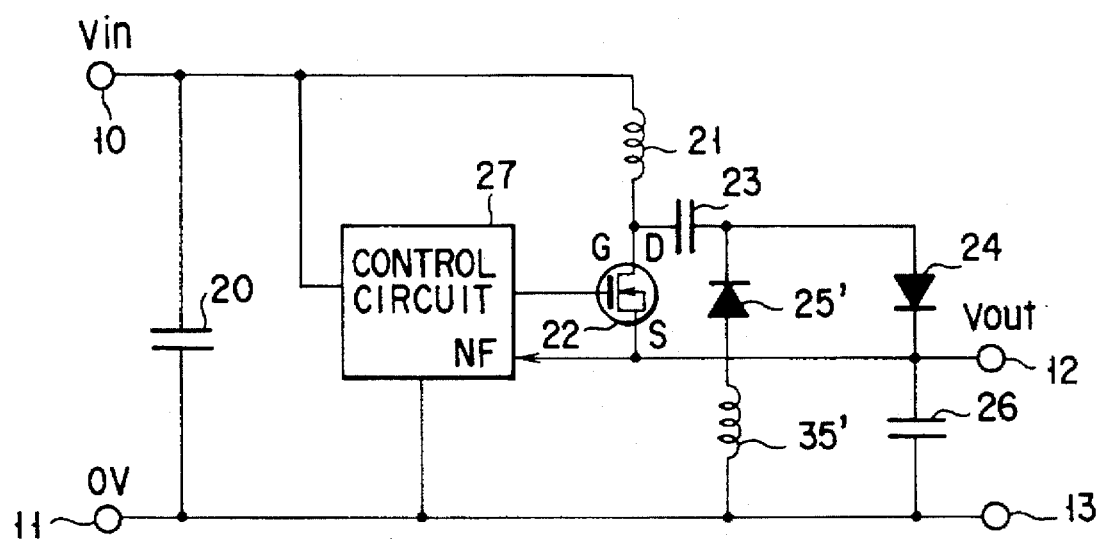
FIG. 15 is a circuit diagram of a chopper-type switching power-supply circuit according to a fourth embodiment of the invention, which operates in the same way as the circuit shown in FIG. 13.

FIG. 15 illustrates a chopper-type switching power-supply circuit according to the fourth embodiment of this invention. The fourth embodiment is identical to the third embodiment, except that the output circuit comprises a diode 24, a diode 25', an inductor 35' and a capacitor 26. The fourth embodiment operates in the same way as the third embodiment.

Fifth Embodiment

Figure 16:
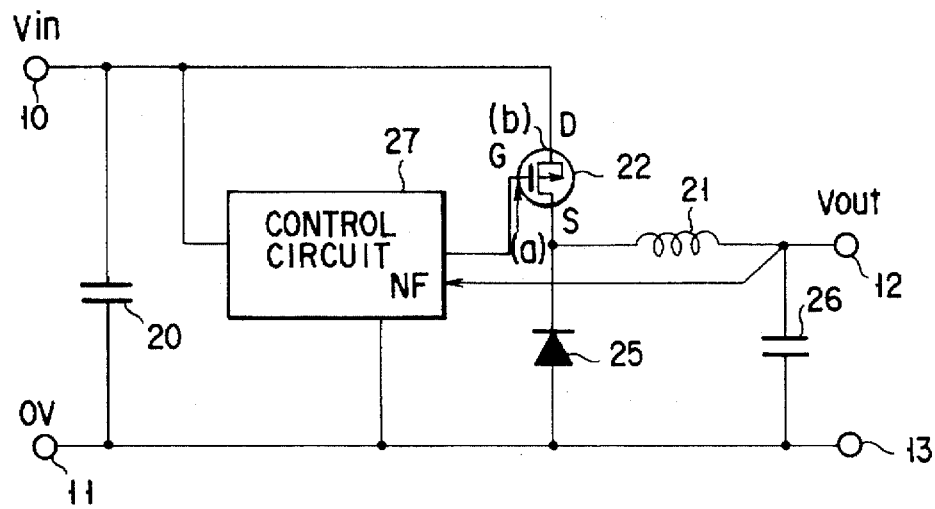
FIG. 16 is a circuit diagram of a conventional inverter circuit having a P-channel MOSFET.
Figure 17A:
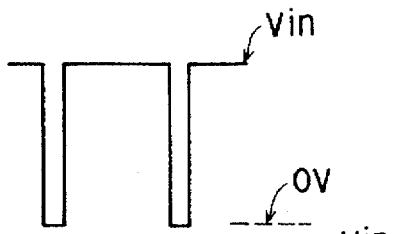
FIGS. 17A and 17B are diagrams depicting the waveforms of the signals at points (a) and (b) shown in FIG. 16.
Figure 17B:
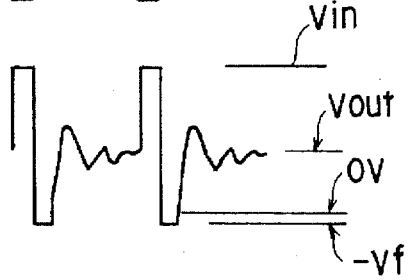

In the fifth embodiment, the average value of the circulating current is equal to that of the output current, as in a conventional inverter circuit of the type shown in FIG. 16. (FIGS. 17A and 17B show the waveforms of the signals at points (a) and (b) shown in FIG. 16.) However, the voltage which excites the second inductor 35 ranges between Vout and a lower voltage, whereas in the conventional inverter circuit (FIG. 16), the exciting voltage ranges between Vin and 0 V.

In the fifth embodiment, the current is supplied to and from the capacitor 23 through the first inductor 21 or the second inductor 35. Thus, even if an voltage is input and output in such a condition that a heat loss would be made, the second inductor 35 will collect the energy in the form of magnetic energy. Thus, the operating efficiency of the sixth embodiment remains sufficiently high even if Vin>Vout+Vf1+Vf2.

Sixth Embodiment

Figure 18:
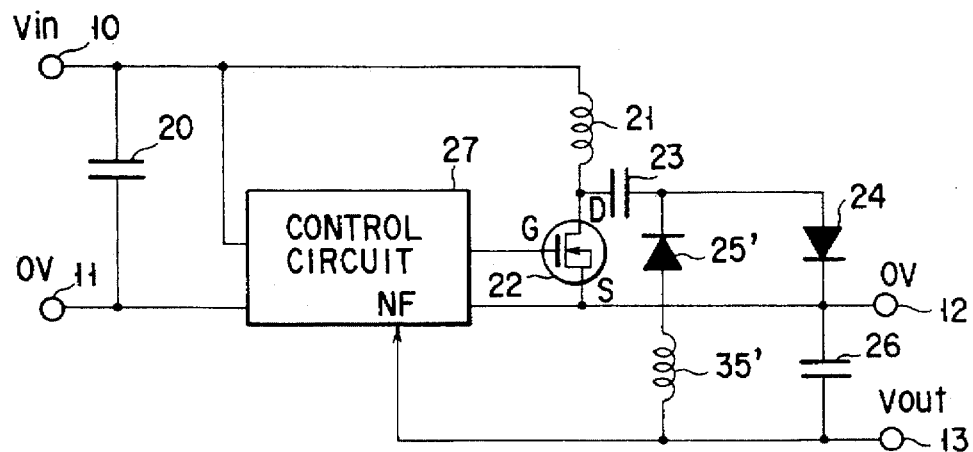
FIG. 18 illustrates a chopper-type switching power-supply circuit according to a sixth embodiment of this invention, which inverts the input voltage by using a second diode and a second inductor.

FIG. 22 illustrates a chopper-type switching power-supply circuit according to the sixth embodiment of the present invention, which inverts the input voltage by using a second diode 25' and a second inductor 35'. As shown in FIG. 18, the diode 25' and the inductor 35' are connected in series. The second diode 25' accelerates the attenuation of the signal waves generated at both ends of the capacitor 23 after a current ceases to circulate. Nonetheless, as the circulating current flows through the second diode 25', an energy loss is made which corresponds to the drop to Vf. It is therefore preferred that the third seventh be used if it is more important to minimize the attenuation of the signal wave, than to reduce the decrease in the operating efficiency.

Seventh Embodiment

Figure 19:
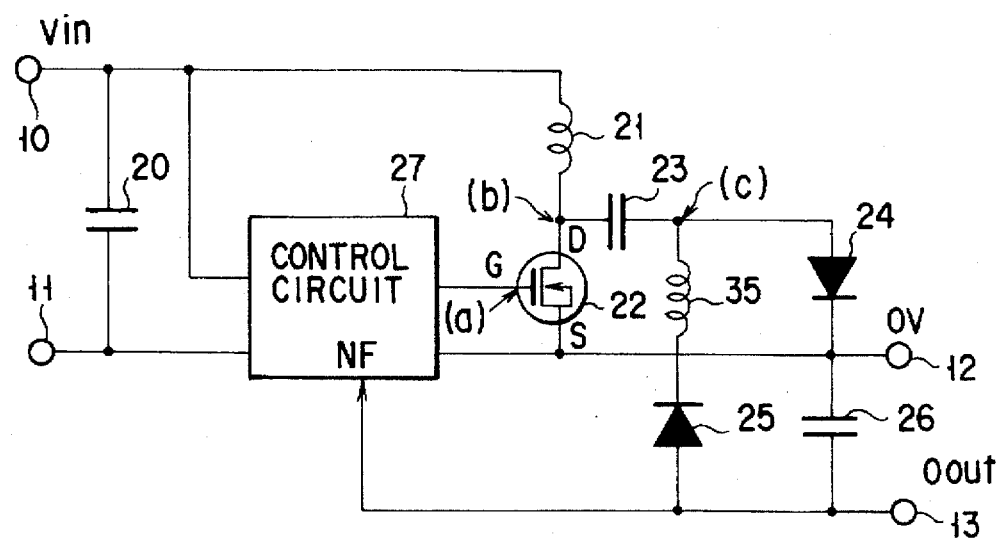
FIG. 19 shows a chopper-type switching power-supply circuit according to a seventh embodiment of the invention, which operates in the same way as the circuit shown in FIG. 18.
Figure 20A:
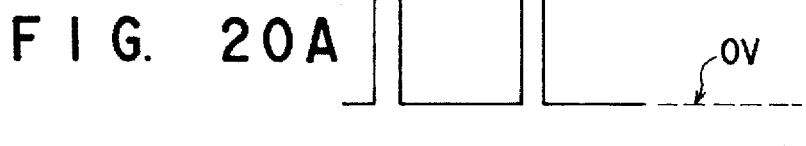
FIGS. 20A, 20B and 20C are diagrams depicting the waveforms of the signals at points (a), (b) and (c) shown in FIG. 19.
Figure 20B:
Figure 20C:

FIG. 19 shows a chopper-type switching power-supply circuit according to an seventh embodiment of the invention, which operates in the same way as the sixth embodiment (FIG. 18). The seventh embodiment differs from the sixth embodiment only in the positioning of the second diode 25' and the second inductor 35'. FIGS. 20A, 20B and 20C depict the waveforms of the signals at points (a), (b) and (c) shown in FIG. 19.

Eighth Embodiment

A power-supply circuit according to the eight embodiment of the invention will be described, with reference to FIG. 21. This is a so-called charge pump circuit. In the eight embodiment, voltages +Vin, −Vin and GND generated by a switching DC power-supply (not shown) are applied to the input terminals 100, 101 and 102, respectively. These voltages are input to the second switch circuit 200. The circuit 200 generates voltages +3Vin, −3Vin and GND, which are input to the second switch circuit 300. The circuit 300 generates voltages +9Vin, −9Vin and GND.

The first switch circuit 200 comprises terminals 201 to 208 and switching elements (not shown). Among the switching elements are switch elements, rectifier elements and resistors. The rectifier elements and the resistors cause a forward-current voltage drop Vf. The voltages +Vin and −Vin are applied to the terminals 201 to 204. A capacitor 600 (C1) is connected between the terminals 205 and 206. A capacitor 602 (C2) is connected between the terminal 207 and the ground, and a capacitor 601 (C2) between the terminal 208 and the ground.

The second switch circuit 300 comprises terminals 301 to 308 and switching elements (not shown). The voltages +3Vin and −3Vin generated by the first switch circuit 200 are applied to the terminals 301 to 304. A capacitor 603 (C1) is connected between the terminals 305 and 306. A capacitor 605 (C2) is connected between the terminal 307 and the ground, and a capacitor 604 (C2) between the terminal 308 and the ground. The output voltages +9Vin and −9Vin are obtained at the terminals 307 and 308.

The eight embodiment is a charge pump circuit for generating voltages +9Vin and −9Vin which are nine times as high as the voltages +Vin and −Vin, respectively, both applied from the switching DC power-supply (not shown). The circuit comprises two charge pump circuits connected in cascade, i.e., the first-state charge pump circuit composed of the first switch circuit 200 and the capacitors 600 to 602, and the second-stage charge pump circuit composed of the second switch circuit 300 and the capacitors 603 to 605.

The first-stage charge pump circuit and the second-state charge pump circuit operate exactly in the same way. Each generates two voltages three times as high as the input voltages.

The input voltages +Vin and −Vin applied from the switching DC power-supply, and the output voltages +9Vin and −9Vin of the eight embodiment are, for example, of the following values:

+Vin=Vin

−Vin=Vin×(−1)

+9Vin=Vin×(+9)

−9Vin=Vin×(−9)

As indicated above, the first-stage and second-state charge pump circuits operate in the same way, either raises the input voltages three times. The operation of only the first-stage charge pump circuit will, therefore, be explained with reference to FIGS. 22A, 22B and 22C.

The first switching circuit 200 sets the following four periods:

(1) Period during which V1 and V2 are applied to C1 and C2, respectively
(2) Period during which V1 is applied to C1
(3) Period during which V2 is applied to C2
(4) Period during which a voltage is applied to neither C1 nor C2

As a result, C11 outputs V5=V3+(V1−V2) by means of diode rectification or synchronous rectification, and C12 outputs V6=V4−(V1−V2) by means of diode rectification or synchronous rectification. When V1=V3, V2=V4=GND, V5=2V1−Vf and V6=V1+Vf.

In the first-stage charge pump circuit, V5−V6 is approximately 3VI if the forward-current voltage drop Vf is sufficiently low. Thus, the input voltages +Vin and −Vin can be raised to +3Vin and −3Vin, respectively.

With reference to FIGS. 22A, 22B and 22C and FIGS. 23A, 23B and 23C, it will be described, in detail, how the eight embodiment operates to raise and lower the input voltage if forward-current voltage drop Vf is neglected.

First it will be explained how the eighth embodiment raises the input voltage, with reference to FIGS. 22A, 22B and 22C. As seen from FIG. 22A, the capacitor C1 is charged with the input voltages +Vin and −Vin. The potential across the capacitor C1 is thereby set at +2Vin. This is achieved by the sequential ON-OFF operation at the terminals 201 to 206 of the first switching circuit 200. The potential difference between +Vin and GND is +3Vin, as can be understood from FIG. 22B. Further, the potential across the capacitor C3 can be changed to +3Vin as shown in FIG. 22C by transferring the potential of the capacitor C1 to the capacitor C3 which is connected between the first input terminal 100 (+Vin) and the ground (GND).

It will now be explained how the eighth embodiment lowers the input voltage, with reference to FIGS. 23A, 23B and 23C. As seen from FIG. 23A, the capacitor C1 is charged with the input voltages +Vin and −Vin. The potential across the capacitor C1 is thereby set at +2Vin, because of the sequential ON-OFF operation at the terminals 201 to 206 of the first switching circuit 200. The potential difference between +Vin and GND is −3Vin, as can be understood from FIG. 23B. Further, the potential across the capacitor C3 can be changed to −3Vin as shown in FIG. 23C by transferring the potential of the capacitor C1 to the capacitor C3 which is connected between the second input terminal 101 (−Vin) and the ground (GND).

The first switching circuit 200 which operates as explained above may have the structure shown in FIG. 24.

As illustrated in FIG. 24, the first switching circuit 200 has switches SW1 to SW8. The switches SW1 to SW8 are closed and opened one after another, for example in the order specified in Table 1 presented below. As the switches SW1 to SW8 are thus closed and opened, predetermined outputs are generated at the output terminals. In mode A, the switch SW1 is off, the switch SW2 is on, the switch SW3 is off, the switch SW4 is off, the switch SW5 is on, the switch SW6 is on, the switch SW7 is off, and the switch SW8 is off. In the other modes B, C, D, E and F, the switches SW1 to SW8 are closed or opened as shown in Table 1.

TABLE 1

|   | SW1 | SW2 | SW3 | SW4 | SW5 | SW6 | SW7 | SW8 |
|---|-----|-----|-----|-----|-----|-----|-----|-----|
| A | OFF | ON  | OFF | OFF | OFF | ON  | OFF | OFF |
| B | ON  | OFF | OFF | OFF | OFF | OFF | OFF | ON  |
| C | OFF | OFF | ON  | OFF | OFF | OFF | OFF | ON  |
| D | OFF | OFF | OFF | ON  | ON  | OFF | OFF | OFF |
| E | OFF | OFF | OFF | ON  | OFF | OFF | ON  | OFF |
| F | OFF | OFF | OFF | OFF | OFF | OFF | OFF | OFF |

As the operating mode of the first switching circuit 200 sequentially changed as shown in Table 1, it can output a specific voltage. When the circuit 200 is operated in modes A, F, D, F and A, for example, it generates voltage V5=V3+(V1−V2) as shown in Table 2 presented below. When the circuit 200 is operated in in various modes in different orders, it generates different voltages as is specified in Table 2.

TABLE 2

| | |
|---|---|
| $V_5 = V_3 + (V_1 - V_2)$ | A→F→D→F→A |
| $V_5 = V_4 + (V_1 - V_2)$ | A→F→E→F→A |
| $V_6 = V_3 - (V_1 - V_2)$ | A→F→B→F→A |
| $V_6 = V_4 - (V_1 - V_2)$ | A→F→C→F→A |

If the eighth embodiment has N charge pump circuits, the output voltage V5 of the Nth-stage charge pump circuit CPN will be $(0.5 \times 3^{NP} - 0.5)$ times the output voltage V1 of the first charge pump circuit CP1, and the output voltage V6 will be $(-0.5 \times 3^N + 0.5)$ times the output voltage V1. Hence, V5−V6 will increase to $3^N$ times the output voltage V1 of the first-state charge pump circuit CP1.

In the case of a negative potential, V5=3V1−Vf and V6=−V1+Vf as in the case of a positive potential, provided that V1=V3, V2=V4=−V1. In this case, too, V5−V6 is approximately 3(V1−V2) if Vf is sufficiently small. If V5 is connected to V1 and V3 of the second-stage charge pump circuit CP2, if V6 is connected to the V2 and V4 of the first-stage charge pump circuit CP1, and if Vf is sufficiently small, V5 of the charge pump circuit CP2 will be 9 times the voltage V1 of the charge pump circuit CP1, −9 times the voltage V1 of the charge pump circuit CP1, and V5−V6 will be 9 times the value V1−V2 of the pump circuit CP1.

Namely, V5 and V6 of the Nth-stage charge pump circuit CPN are raised to $3^N$ times the values V1 and V2 of the first-stage charge pump circuit CP1, respectively. Further, V5 −V6 o the charge pump circuit CPN is raised to $3^N$ times the value V1−V2 of the first-stage charge pump circuit CP1.

In the first switching circuit 200, the terminals other than V5 and V6 are connected similarly as described above. The eight embodiment can therefore raise the input voltage to about $3^N$ times as much. In other words, the eight embodiment has an amplification factor of approximately $3^N$, whereas the conventional charge pump circuit comprises of N stages can raise the input voltage, but only N times as much.

Ninth Embodiment

Figure 25:
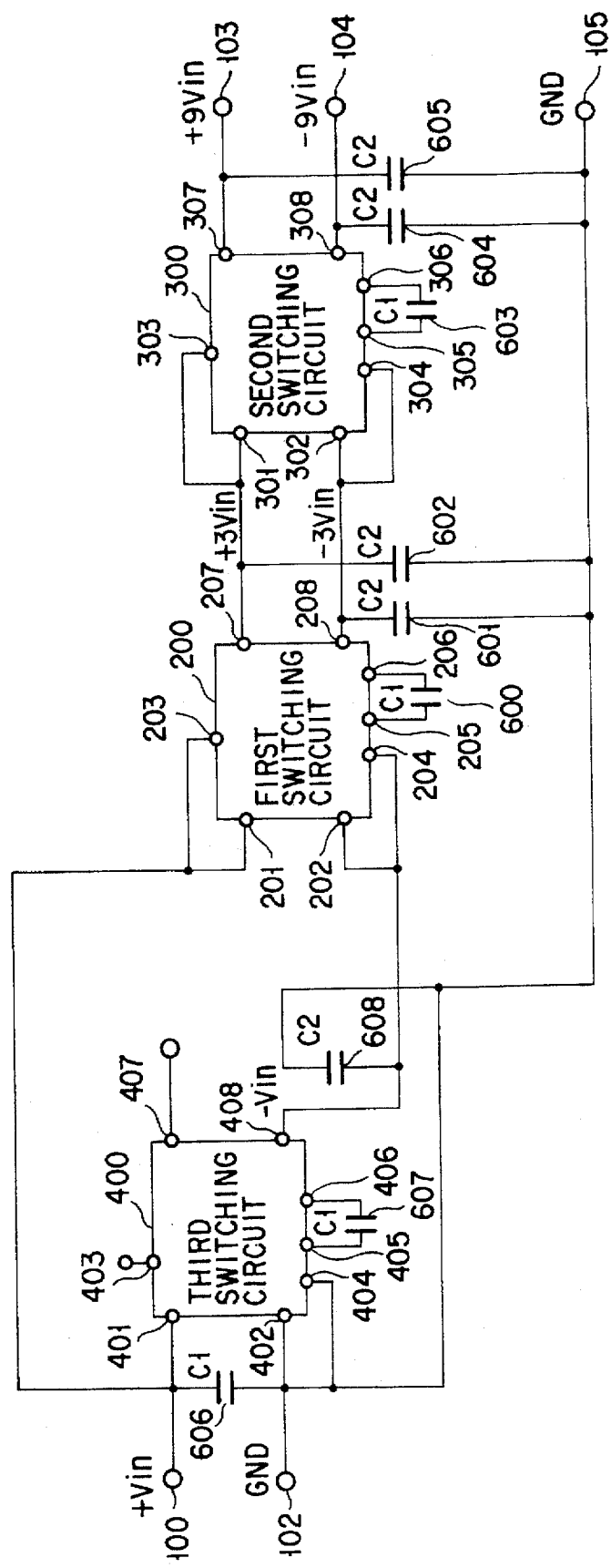
FIG. 25 is a circuit diagram of a power-supply circuit according to a tenth embodiment of this invention.

A power-supply circuit according to the ninth embodiment of this invention will be described, with reference to FIG. 25. The ninth embodiment comprises three charge pump circuits CP1, CP1 and CP3. The first- and second-stage charge pump circuits CP1 and CP2 are identical to those shown in FIG. 21. The third-stage charge pump circuit CP3 is connected to the inputs of the first- and second-stage charge pump circuits CP1 and CP2. The circuit CP3 can increase the input voltage twice and can invert the same. The circuit CP3 will be described, with reference to FIG. 26.

As shown in FIG. 26, the third-stage charge pump circuit CP3 has a third switching circuit 400. The circuit 400 has terminals 401 to 408 and switching element (now shown). Among the switching elements are switch elements, rectifier elements and resistors. Voltages +Vin and GND are applied to the terminals 401 and 402. A capacitor 607 (C1) is connected to the terminals 405 and 406. A capacitor 606 (C1) is connected between the terminals 401 and 402. The to 204. A capacitor 600 (C1) is connected between the terminals 205 and 206. The terminal 408 is connected by a capacitor 608 (C2) to the first-stage charge pump circuit CP1.

As may be understood from FIG. 26, the third-stage charge pump circuit CP3 can generate voltages +Vin, −Vin and GND from the input voltages +Vin and GND. The ninth embodiment can therefore operate as a transformer which raises the input voltages nine time. It generates +9Vin and −9Vin from the input voltages +Vin and GND.

Tenth Embodiment

Figure 27:
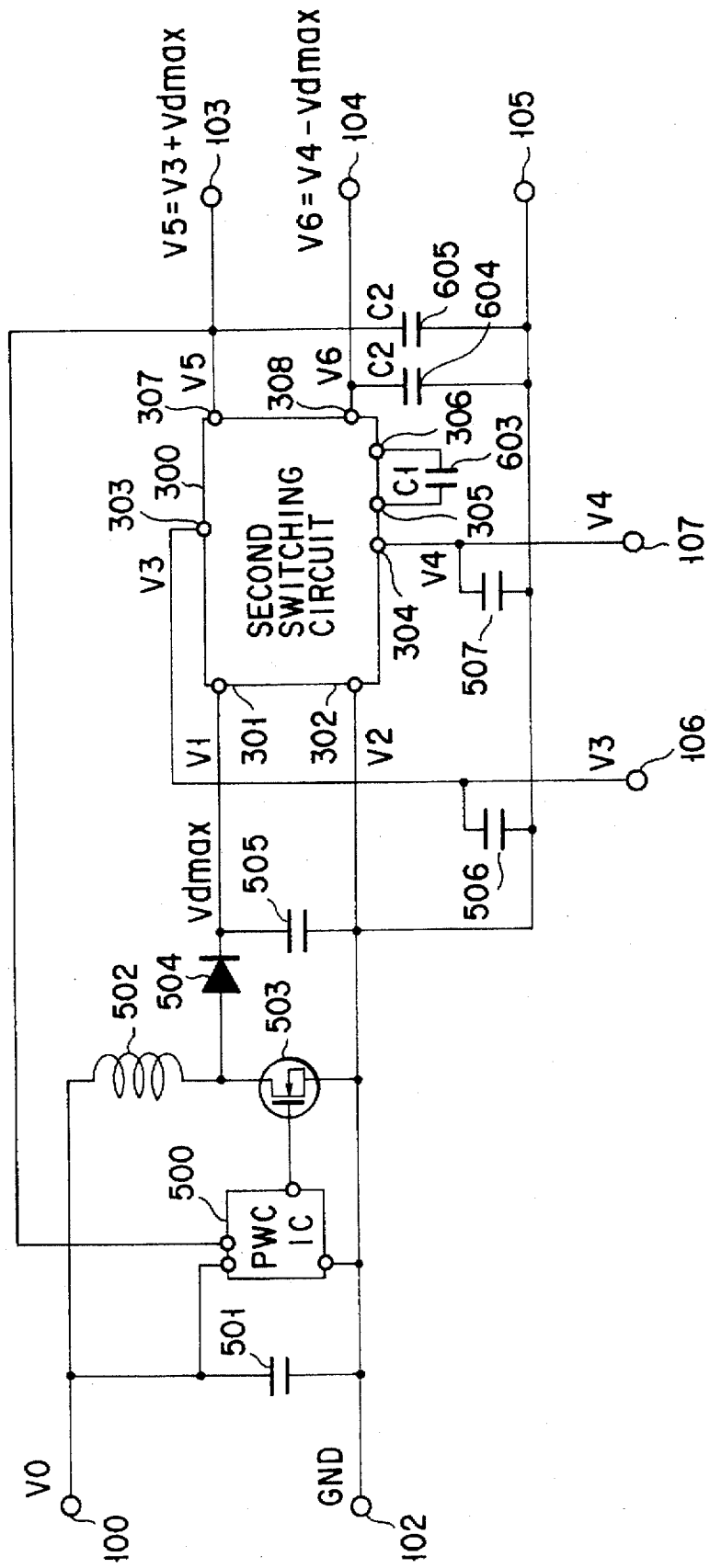
FIG. 27 is a circuit diagram illustrating a power-supply circuit according to the present invention.

A power-supply circuit according to the tenth embodiment of the present invention will be described, with reference to FIG. 27. The tenth embodiment comprises a switching DC power-supply SR and one charge pump circuit CP. The switching DC power-supply SR is, for example, a chopper circuit. The output of the power-supply SR is connected to the input of the charge pump circuit CP. The voltages V5 or V6 at the last stage of the charge pump circuit CP is fed back to the control circuit of the switching DC power-supply SR. The tenth embodiment can, therefore, raise the input voltage at a high ratio and invert the input voltage.

Figure 21:
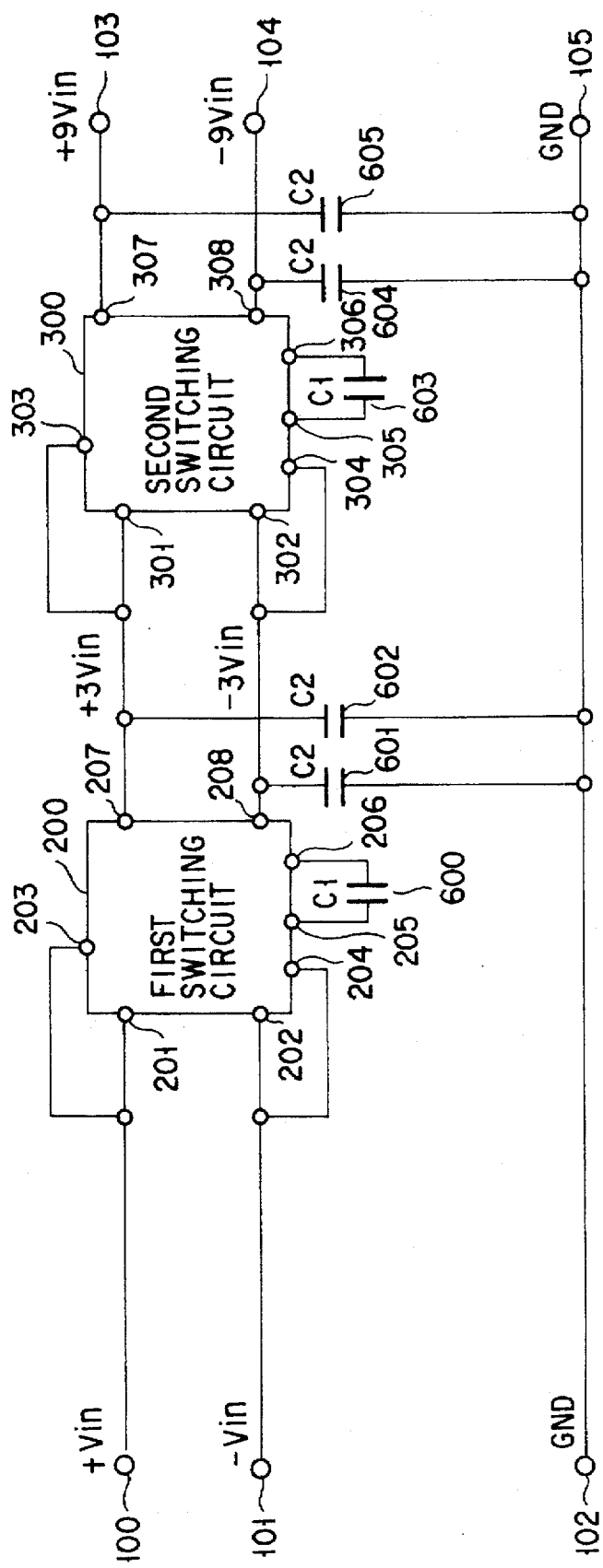
FIG. 21 is a circuit diagram of a power-supply circuit according to a eighth embodiment of the present invention.

More precisely, the tenth embodiment is a combination of the second-stage charge pump circuit PC2 shown in FIG. 21 and the switching DC power-supply SR. The switching DC power-supply SR comprises a control circuit 500, a capacitor 501, an inductor 502, a switching element 503 such as a FET, a rectifying diode 504, a smoothing capacitor 505, and capacitors 506 and 507. The power-supply SR is designed to switch the voltages V0 and GND applied to the input terminals 100 and 101, thereby to generate a maximum output Vd max. The output Vd max is greater than the input voltage V0 and can be adjusted by feedback to make the voltage V5 to acquire a predetermined value.

As has been described above, the present invention can provide a chopper-type switching power-supply circuit which is relatively simple in structure, having an N-channel MOSFET, and which can yet operate at high efficiency, both lowering and inverting an input voltage.

Also can the invention provide a power-supply circuit which is relatively simple in structure and which can yet raises an input voltage with a high ratio and invert the input voltage and generate DC voltages of different values, by charging a plurality of capacitors with a DC voltage applied from a DC power-supply.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A chopper-type switching power-supply circuit having a DC high-potential input terminal, a DC low-potential input terminal, a DC high-potential output terminal and a DC low-potential output terminal, said circuit comprising:

an inductor connected at one end to the DC high-potential input terminal;

a capacitor connected at one end to the other terminal of the inductor;

an output circuit which comprises said DC high-potential output terminal and said DC low-potential output terminal and which has a first input terminal coupled to the other end of said capacitor and a second input terminal coupled to the DC low-potential input terminal;

an N-channel MOSFET having a drain electrode connected to the other end of said inductor and a source electrode connected to the high-potential output terminal; and a control circuit, including at least a differential amplifier and a PWM control amplifier, for supplying a pulse-width control signal to the gate electrode of said N-channel MOSFET in accordance with the potential at the output terminals of said output circuit, thereby to perform negative feedback chopper control on said N-channel MOSFET.

2. The circuit according to claim 1, wherein said output circuit includes a first diode, a second diode and an additional capacitor, the anode electrode of the first diode and the cathode electrode of the second diode are connected to the other end of said capacitor, the cathode electrode of the first diode is connected to said DC high-potential output terminal, and the additional capacitor is connected between the DC high-potential output terminal and the DC low-potential output terminal.

3. A chopper-type switching power-supply circuit having an N-channel MOSFET, an inductor, a capacitor, a diode, a chopper control circuit, an input voltage Vin, an output voltage Vout, and a common potential GND, wherein said inductor is connected between the input voltage Vin and the drain electrode of said N-channel MOSFET, the source electrode of said N-channel MOSFET is connected to a potential VH which is the higher of the output voltage Vout and the common potential GND, said capacitor and said diode are connected in series between the drain and source electrodes of said N-channel MOSFET, with said capacitor connected to the drain electrode, the anode electrode of said diode is connected to said capacitor, the cathode electrode of said diode is connected to the source electrode of said N-channel MOSFET, and the input voltage Vin and the potential VH have a relationship of: Vin>VH.

4. The circuit according to claim 3, wherein at least one of a second inductor and a second diode is connected in series between the anode electrode of said diode and a potential VL which is the lower of the output voltage Vout and the common potential GND, and, when the second diode is connected, the anode electrode and cathode electrode of the second diode are connected to the potential VL and the potential VH, respectively.

5. The circuit according to claim 3, in which the potential VH is connected to the output voltage Vout and the potential VL is connected to the common potential GND, and which further comprises means for generating a DC voltage lower than the input voltage Vin.

6. The circuit according to claim 3, in which the potential VH is connected to the common potential GND and the potential VL is connected to the output voltage Vout, and which further comprises means for generating a negative voltage by inverting the polarity of the input voltage Vin.

7. The circuit according to claim 3, wherein a plurality of diodes and a plurality of resistors are connected in parallel between the source and gate electrodes of said N-channel MOSFET, the anode electrode of said diode is connected to the source electrode of said N-channel MOSFET, the cathode electrode of said diode is connected to the gate electrode of said N-channel MOSFET, and which further comprises means for supplying a chopper-type switching signal through said capacitor to the gate electrode of said N-channel MOSFET.

8. The circuit according to claim 7, in which the potential VH is connected to the output voltage Vout and the potential VL is connected to the common potential GND, and which further comprises means for generating a DC voltage lower than the input voltage Vin.

9. A chopper-type switching power-supply circuit having a DC high-potential input terminal, a DC low-potential input terminal, a DC high-potential output terminal and a DC low-potential output terminal, said circuit comprising:

an inductor connected at one end to the DC high-potential input terminal;

a capacitor connected at one end to the other terminal of the inductor;

an output circuit which comprises said DC high-potential output terminal and said DC low-potential output terminal and which has a first input terminal coupled to the other end of said capacitor and a second input terminal coupled to the DC low-potential input terminal;

an N-channel MOSFET having a drain electrode connected to the other end of said inductor and a source electrode connected to the high-potential output terminal; and a control circuit for supplying a pulse-width control signal to the gate electrode of said N-channel MOSFET in accordance with the potential at the output terminals of said output circuit, thereby to perform negative feedback chopper control on said N-channel MOSFET;

wherein said output circuit includes a first diode, a second diode and an additional capacitor, the anode electrode of the first diode and the cathode electrode of the second diode are connected to the other end of said capacitor, the cathode electrode of the first diode is connected to said DC high-potential output terminal, and the additional capacitor is connected between the DC high potential output terminal and the DC low potential output terminal.

10. A chopper-type switching power-supply circuit having a DC high-potential input terminal, a DC low-potential input terminal, a DC high-potential output terminal and a DC low-potential output terminal, said circuit comprising:

an inductor connected at one end to the DC high-potential input terminal;

a capacitor connected at one end to the other terminal of the inductor;

an output circuit which comprises said DC high-potential output terminal and said DC low-potential output terminal and which has a first input terminal coupled to the other end of said capacitor and a second input terminal coupled to the DC low-potential input terminal;

an N-channel MOSFET having a drain electrode connected to the other end of said inductor and a source electrode connected to the high-potential output terminal; and a control circuit for supplying a pulse-width control signal to the gate electrode of said N-channel MOSFET in accordance with the potential at the output terminals of said output circuit, thereby to perform negative feedback chopper control on said N-channel MOSFET, wherein said output circuit includes a first diode and a second diode and an additional capacitor, the cathode electrode of the first diode and the anode electrode of the second diode are connected to the other end of said capacitor, and the anode electrode of the first diode is connected to said DC high-potential output terminal.

11. The circuit of claim 10, wherein the control circuit includes at least a differential amplifier and a PWM control amplifier.

12. A chopper-type switching power-supply circuit having a DC high-potential input terminal, a DC low-potential input terminal, a DC high-potential output terminal and a DC low-potential output terminal, said circuit comprising:

an inductor connected at one end to the DC high-potential input terminal;

a capacitor connected at one end to the other terminal of the inductor;

an output circuit which comprises said DC high-potential output terminal and said DC low-potential output terminal and which has a first input terminal coupled to the other end of said capacitor and a second input terminal coupled to the DC low-potential input terminal;

an N-channel MOSFET having a drain electrode connected to the other end of said inductor and a source electrode connected to the high-potential output terminal; and a control circuit for supplying a pulse-width control signal to the gate electrode of said N-channel MOSFET in accordance with the potential at the output terminals of said output circuit, thereby to perform negative feedback chopper control on said N-channel MOSFET, wherein said output circuit includes a diode, an additional inductor, and an additional capacitor, the anode electrode of the diode and one end of the additional inductor are connected to the other end of said capacitor, the cathode electrode of said diode is connected to said DC high-potential output terminal, the other end of the additional inductor is connected to said DC low-potential output terminal, and the additional capacitor is connected between said DC high-potential output terminal and said DC low-potential output terminal.

13. The circuit of claim 12, wherein the control circuit includes at least a differential amplifier and a PWM control amplifier.

14. A chopper-type switching power-supply circuit having a DC high-potential input terminal, a DC low-potential input terminal, a DC high-potential output terminal and a DC low-potential output terminal, said circuit comprising:

an inductor connected at one end to the DC high-potential input terminal;

a capacitor connected at one end to the other terminal of the inductor;

an output circuit which comprises said DC high-potential output terminal and said DC low-potential output terminal and which has a first input terminal coupled to the other end of said capacitor and a second input terminal coupled to the DC low-potential input terminal;

an N-channel MOSFET having a drain electrode connected to the other end of said inductor and a source electrode connected to the high-potential output terminal; and a control circuit for supplying a pulse-width control signal to the gate electrode of said N-channel MOSFET in accordance with the potential at the output terminals of said output circuit, thereby to perform negative feedback chopper control on said N-channel MOSFET, wherein said output circuit includes a first diode, a second diode, an additional inductor, and an additional capacitor, the anode electrode of the first diode and the one end of the additional inductor are connected to the other end of said capacitor, the cathode electrode of the first diode is connected to said DC high-potential output terminal, the other end of the additional inductor is connected to the cathode electrode of the second diode, the anode electrode of the second diode is connected to the DC low-potential output terminal, and the additional capacitor is connected between said DC high potential output terminal and said DC low-potential output terminal.

15. The circuit of claim 14, wherein the control circuit includes at least a differential amplifier and a PWM control amplifier.

16. A chopper-type switching power-supply circuit having a DC high-potential input terminal, a DC low-potential input terminal, a DC high-potential output terminal and a DC low-potential output terminal, said circuit comprising:

an inductor connected at one end to the DC high-potential input terminal;

a capacitor connected at one end to the other terminal of the inductor;

an output circuit which comprises said DC high-potential output terminal and said DC low-potential output terminal and which has a first input terminal coupled to the other end of said capacitor and a second input terminal coupled to the DC low-potential input terminal;

an N-channel MOSFET having a drain electrode connected to the other end of said inductor and a source electrode connected to the high-potential output terminal; and a control circuit for supplying a pulse-width control signal to the gate electrode of said N-channel MOSFET in accordance with the potential at the output terminals of said output circuit, thereby to perform negative feedback chopper control on said N-channel MOSFET, wherein said output circuit includes a first diode, a second diode, an additional inductor, and an additional capacitor, the anode electrode of the first diode and the cathode electrode of the second diode are connected to the other end of said capacitor, the cathode electrode of the first diode is connected to said DC high-potential output terminal, the anode electrode of the second diode is connected to one end of the additional inductor, the other end of the additional inductor is connected to said DC low-potential output terminal, and the additional capacitor is connected between said DC high-potential output terminal and said DC low-potential output terminal.

17. The circuit of claim 16, wherein the control circuit includes at least a differential amplifier and a PWM control amplifier.

* * * * *